United States Patent [19]

Kriaski et al.

[11] Patent Number: 5,061,090
[45] Date of Patent: Oct. 29, 1991

[54] SHAFT AND BEARING ASSEMBLY

[75] Inventors: John R. Kriaski; Bimal K. Chateriee, both of Jackson, Tenn.

[73] Assignee: Porter-Cable Corporation, Jackson, Tenn.

[21] Appl. No.: 531,039

[22] Filed: May 31, 1990

[51] Int. Cl.⁵ .................... F16C 43/04; B24B 23/00
[52] U.S. Cl. .................... 384/537; 29/898.07; 51/170 MT; 384/585; 403/274
[58] Field of Search .................. 384/504–506, 384/512, 537, 538, 539, 584, 585, 569, 564, 542; 403/274, 277, 282; 29/898.06, 898.07; 51/170 MT

[56] References Cited

U.S. PATENT DOCUMENTS

| | | |
|---|---|---|
| 1,059,538 | 4/1913 | Hess . |
| 1,308,522 | 7/1919 | Delmar . |
| 2,851,830 | 9/1958 | Metzig et al. . |
| 3,496,680 | 2/1970 | Hutchins ........................... 51/170 |
| 4,056,291 | 11/1977 | Kraft et al. . |
| 4,395,078 | 7/1983 | Smith, Sr. et al. ............... 384/506 |
| 4,516,358 | 5/1985 | Marton et al. ................... 51/119 |
| 4,774,788 | 10/1988 | Shacham et al. ................. 51/168 |
| 4,848,938 | 7/1989 | Haas et al. ...................... 384/537 |
| 4,854,085 | 8/1989 | Huber ........................ 51/170 MT |
| 4,887,917 | 12/1989 | Tröster et al. ............... 384/537 X |

FOREIGN PATENT DOCUMENTS 313377 6/1929 United Kingdom ............... 384/537

Primary Examiner—Thomas R. Hannon
Attorney, Agent, or Firm—Merchant, Gould, Smith, Edell, Welter & Schmidt

[57] ABSTRACT

Disclosed is a shaft and bearing assembly comprising a cylindrical shaft. The bearing assembly comprises first and second ends, the bearing assembly further comprising a ball bearing having an inner race positioned over the shaft. A restraining mechanism is located on the shaft for preventing the first end of the bearing assembly from coming off the shaft. The shaft further comprises an end formed over the second end of the bearing assembly in order to hold the bearing assembly against the restraining mechanism and onto the shaft.

2 Claims, 3 Drawing Sheets

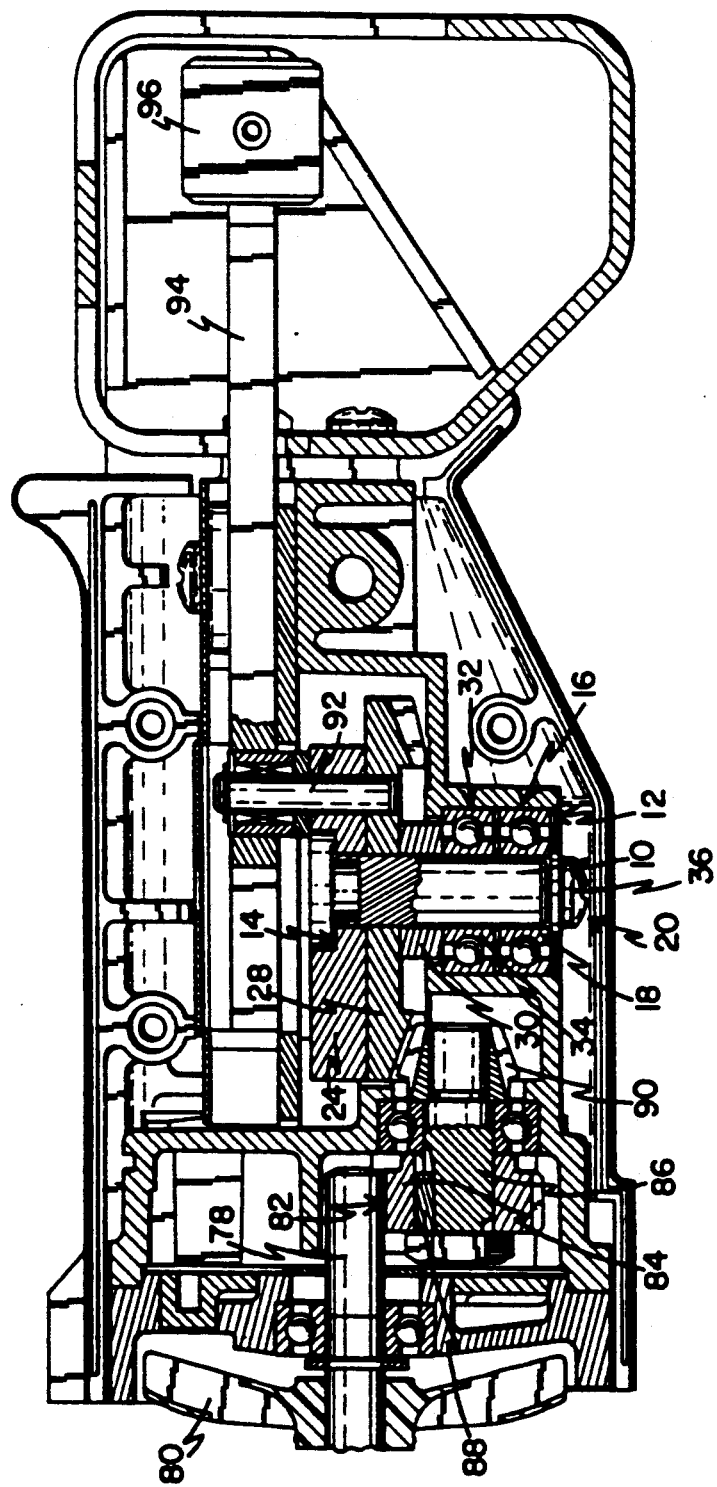

SHAFT AND BEARING ASSEMBLY

BACKGROUND OF THE INVENTION

The present invention is an shaft and bearing assembly. Although the present invention is disclosed in the context of particular power tools, it is not limited to such applications.

When an assembly comprising a ball bearing is fitted onto a shaft, it is typically assembled onto the shaft by press fitting or otherwise assembling the assembly from one end of the shaft. It is then often necessary to provide a mechanism for preventing the bearing assembly from coming off the shaft end over which it was originally placed. In many instances, it is important that the mechanism used not only provide a safe and dependable restraint but also take a minimum of space next to the bearing assembly. It is also of interest from a cost standpoint to minimize the total number of parts used.

Several attempts at such restraints have been previously tried. For example, U.S. Pat. No. 4,854,085 illustrates the use of a snap ring 60 for holding together an output shaft and bearing assembly. A major disadvantage of such a restraint is its inclination to break. U.S. Pat. No. 4,056,291 uses a conventional hub and set screw to hold a clutch housing and bearing assembly onto its drive shaft 70, as shown in FIG. 8 of the patent. Such a conventional hub and set screw requires considerable volume and depends upon the tightness of the set screw for securing the assembly. U.S. Pat. No. 4,516,358 discloses use of a lock ring 30 which retains spindle 22 and bearings 26 within the confines of housing 14, as is discussed in column 3 at lines 51-54 of the patent. As with the snap ring 60 disclosed in U.S. Pat. No. 4,854,085, the lock ring disclosed in U.S. Pat. No. 4,516,358 is inclined to break. Further, such snap or lock rings, if placed at the end of a shaft, result in a restraining mechanism that requires substantial volume, since the shaft must extend beyond the snap or lock ring in order to hold the ring in place. U.S. Pat. No. 3,496,680 discloses use of a retaining ring 42, the outer edge portion of which bears annularly and upwardly against the inner race 38 of a ball bearing, with a screw 40 being used to hold retaining ring 42 in place. Accordingly, this method of attachment is also conventional, with the same inclination of ring 42 to break, take up valuable space, and add to the cost of the product. Other possible approaches of restraining a bearing assembly onto a shaft includes a simple press fit, which is much less safe, and a split output shaft with tapered threads in the end of the shaft, this approach having the potential problem of developing too much pressure on the press fit inside the bearings, thus developing excessive heat during tool operation.

The present invention overcomes the prior art problems discussed above and provides a safe restraint for retaining a bearing assembly onto a shaft at one end of the shaft while occupying minimum space at the end of the shaft without disturbing the functional properties of the bearing and without the cost of an additional part such as a snap ring.

SUMMARY OF THE INVENTION

The present invention is a shaft and bearing assembly comprising a cylindrical shaft. The bearing assembly comprises first and second ends, the bearing assembly further comprising a ball bearing having an inner race positioned over the shaft. A restraining mechanism is located on the shaft for preventing the first end of the bearing assembly from coming off the shaft. The shaft further comprises an end formed over the second end of the bearing assembly in order to hold the bearing assembly against the restraining mechanism and onto the shaft.

BRIEF DESCRIPTION OF THE DRAWINGS

FIG. 6 illustrates an alternate preferred embodiment of the present invention configured with a Porter-Cable reciprocating all-purpose saw.

DETAILED DESCRIPTION OF THE PREFERRED EMBODIMENTS

Figure 1:
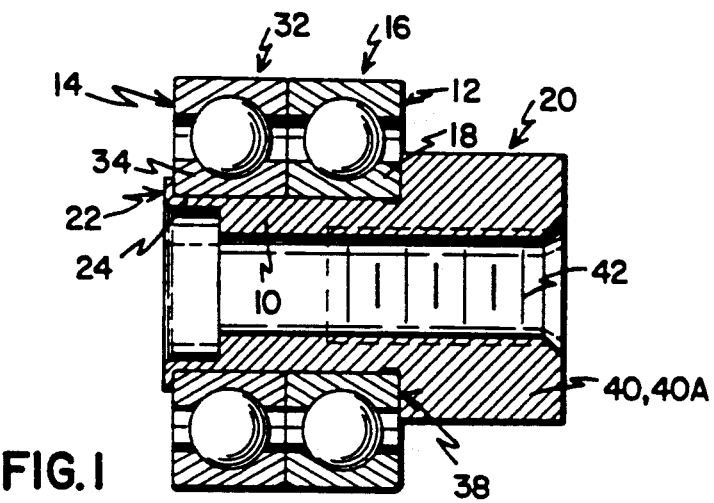
FIG. 1 illustrates a preferred configuration of the present invention.
Figure 2:
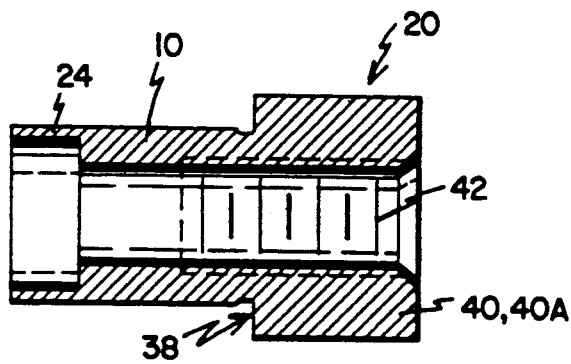
FIG. 2 illustrates a preferred shaft embodiment compatible with the present invention.

Referring to the figures, the present shaft and bearing assembly invention comprises a cylindrical shaft 10 and a bearing assembly having first and second ends 12 and 14, respectively, the bearing assembly comprising a ball bearing 16 having an inner race 18 positioned over shaft 10. Restraining means 20 is located on shaft 10 for preventing first end 12 of the bearing assembly from coming off the shaft. If desired, restraining means 20 may be conventional. Shaft 10 comprises an end 22 formed over the second end 14 of the bearing assembly in order to hold the bearing assembly against the restraining means 20 and onto shaft 10.

In the preferred embodiment, formed end 22 of cylindrical shaft 10 comprises a substantially cylindrical wall 24, at least a portion 22 of substantially cylindrical wall 24 being formed over second end 14 of the bearing assembly.

As will be further discussed below, the bearing assembly of the present invention may comprise one or more components such as 26, 28 and 30 (see FIG. 6) in addition to a ball bearing such as 16. Further, the bearing assembly may comprise first and second ball bearings such as 16 and 32, each having an inner race 18 and 34, respectively, positioned over cylindrical shaft 10 and held in tandem against restraining means 20 by the formed end 22 of the cylindrical shaft. By way of a further example, first and second ball bearings 16 and 32 may be replaced with a single double row ball bearing.

Figure 5:
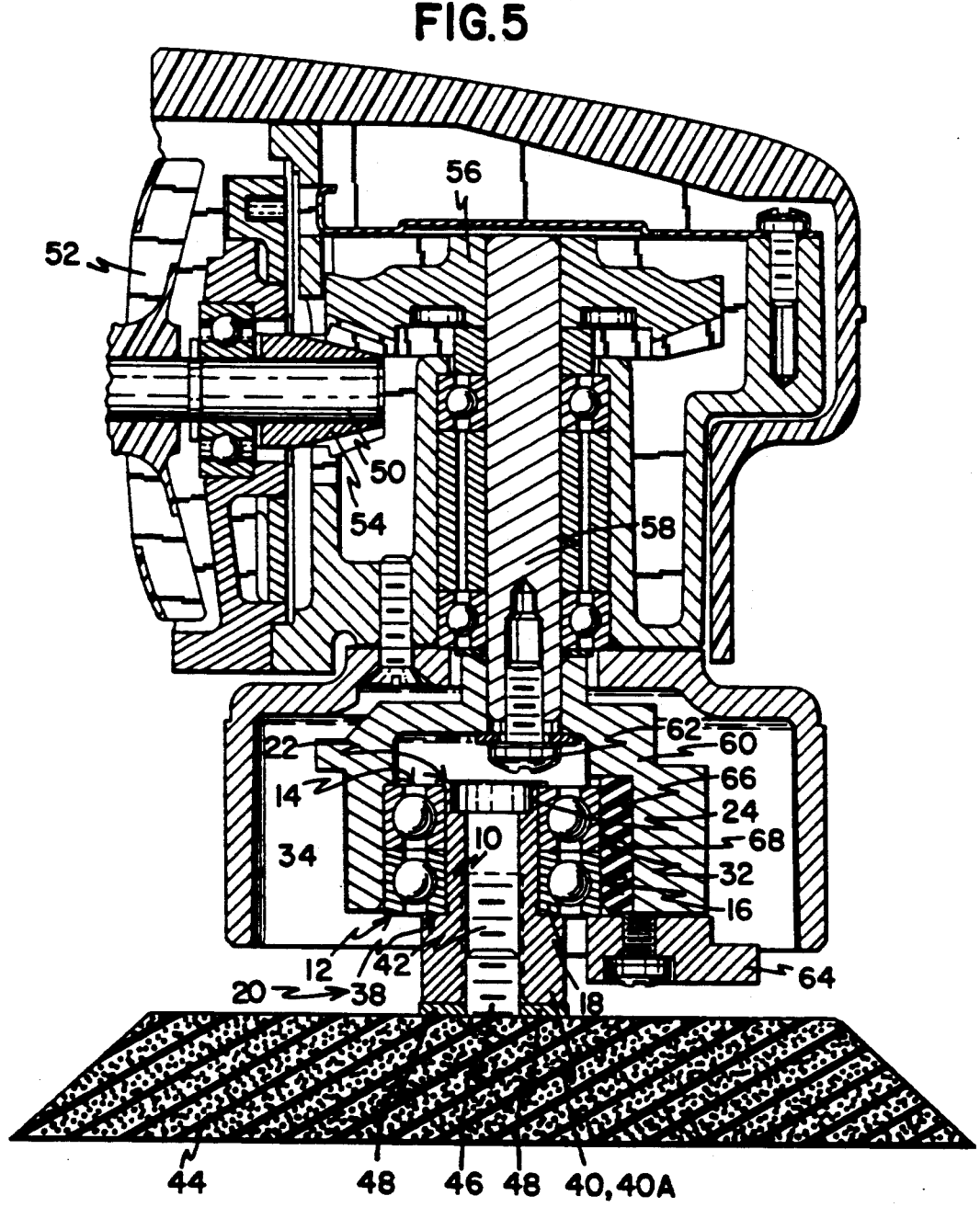
FIG. 5 illustrates a preferred embodiment of the present invention configured with a Porter-Cable random orbit sander.

An example of applying the present invention is illustrated in FIG. 5, which shows the present invention in use as a power tool output shaft on a random orbit sander sold under the Porter-Cable Model 7334 trademark. In this application, a sanding pad 44 is a driven member which is secured to the output of the sander with a connector 46 threaded into interior thread 42 of shaft 10, there being a fiber washer 48 shown between sanding pad 44 and the end of the output shaft.

The operation of the random orbit sander will now be briefly described. Armature shaft 50 driven by a motor and coupled to cooling fan 52 drives a spiral beveled pinion gear 54 which in turn drives gear 56 and gear shaft 58, gears 54 and 56 being press-fit onto their corresponding shafts 50 and 58, respectively. Gear shaft 58 is coupled to an eccentric housing 60 with a machine screw 62 which is self-tightening based on the direction of machine rotation.

The shaft and bearing assembly configured for this application is held in eccentric housing 60 via a secondary counterweight 64, with rubber plug 66 being provided between eccentric housing interior wall 68 and the outer races of bearings 16 and 32, the rubber plug keeping the outer races from spinning within the eccentric housing. Accordingly, rotational movement of eccentric housing 68 causes sanding pad 44 to rotate in a random orbit, with pad 44 spinning on output shaft 10.

The importance of having a reliable restraint at formed end 22 of shaft 10 can be seen, since if such a restraint were to fail, shaft 10 could extract itself from the inner races of bearings 16 and 32, causing pad 44 to fly dangerously away from the machine. Thus, the importance of providing a safe mechanism for holding shaft 10 onto the shaft and bearing assembly can be seen, it being evident that prior art approaches through use of restraints such as snap rings would not only raise serious safety problems, but also occupy substantially more volume in the configuration shown, as well as require the cost of an additional part.

An alternate application of the present invention is shown in FIG. 6, which illustrates a partial cross section of a reciprocating saw sold under the Porter-Cable Tiger Cub model 647 trademark. The figure illustrates a cooling fan 80 mounted on an armature 78, with armature 78 comprising an integral pinion gear at 82. Pinion gear 82 drives an output gear 84 for a first gear reduction set, output gear 84 transferring power to gear shaft 86 through keyway 88. Gear shaft 86 drives a pinion gear 90 for a second gear reduction set, pinion gear 90 driving an output gear 28 which is press fit to shaft 10. In addition to output gear 28 and bearings 16 and 32, the shaft and bearing assembly shown in FIG. 6 also includes a counterweight 24 and a spacer 30. Thus, as previously indicated, the present shaft and bearing assembly invention may include one or more components in addition to a ball bearing. In operation, a pin 92, which is press fit into counterweight 24, and a gear 28 drives a blade arm 94, thus causing the reciprocating motion necessary for operation of the saw, there being an adapter 96 for mounting a reciprocating saw blade substantially in line with shaft 94.

Figure 7:
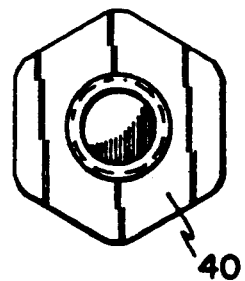
FIGS. 7 and 8 illustrate alternate preferred end view configurations of the preferred shaft shown in FIG. 2, in which one end of the shaft is configured with a nut design.
Figure 8:
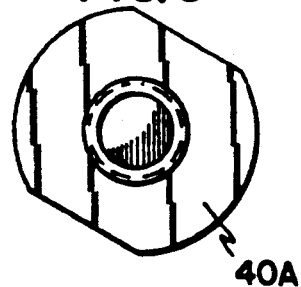

In developing the preferred formed end 22 as illustrated in the drawings, it was found that two important design parameters were the temper of the material used and the lip length of material which is to be rolled over the second end 14 of the bearing assembly. For the embodiment illustrated in FIG. 1, a search was made for what material could be used in the shaft that would be soft enough on formed end 22 to be die rolled without cracking while being hard enough on the opposite end of the shaft so that the corners of the nut configurations 40 and 40A, shown in FIG. 7 and 8, would be resistant to rounding over from the use of a wrench on the nut. It was ultimately determined in that application that 1144 cold rolled steel which was annealed after machining proved satisfactory, the annealing improving the formability of formed end 22. In addition, induction hardening was used in the region of nut configurations 40 or 40A to make those areas hard and resistant to rounding.

Figure 4:
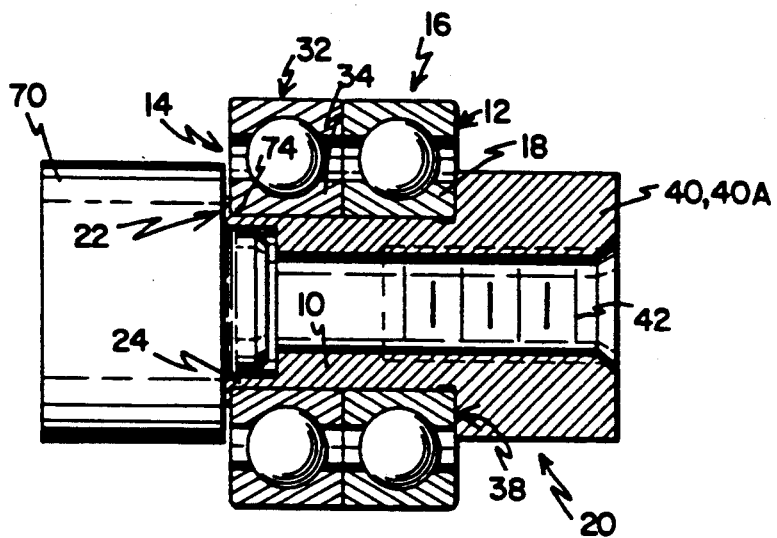
FIG. 4 illustrates the die roll in use at the time of completing a preferred die roll process compatible with the present invention.
Figure 3:
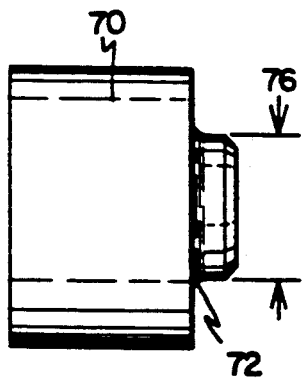
FIG. 3 shows a preferred die roll for use during an assembly process of the preferred embodiment of the present invention.

Another important consideration in the development of the preferred design was the lip length to be rolled over the end of the bearing assembly. It was found that, in order to provide sufficient strength, the lip length had to exceed the radius of the adjoining corner of the bearing inner race or other adjacent component. However, if the lip length was too long, the forming process would result in cracks which would eventually propagate and result in substantially reduced strength. Further, with respect to the properties of die roll 70 (see FIG. 3), it was determined that radius 72 had to at least be equal to or exceed the radius or chamfer 74 of the adjoining corner of the bearing inner race or other component, plus the thickness of the lip of cylindrical wall 24 that was to be rounded over by the die. In the embodiment illustrated in FIG. 4, it was found that, with shaft 10 having an outer diameter ranging between 0.4724 and 0.4729, a thickness of cylindrical wall 24 ranging between 0.025 and 0.035 inch was satisfactory, and that, with bearings having a nominal radius or chamfer of 0.020 inch at corner 74, a radius 72 ranging between 0.045 and 0.055 inch was satisfactory. Diameter 76 of die 70 was found through experimentation, and in the preferred configuration shown was found to work satisfactorily with a diameter ranging between 0.390 and 0.395 inch. Those skilled in the art will recognize that many other sizes and applications of the present invention could lend themselves to widely varying dimensions depending upon the application at hand.

Restraining means 20 may comprise alternate designs. For example, restraining means 20 may comprise a machine screw 36 (FIG. 6) threaded into the end of cylindrical shaft 10 opposite formed end 22. By way of an alternate example, restraining means 20 may comprise a shoulder 38 formed on cylindrical shaft 10. Further, shoulder 38 may comprise an exterior nut configuration 40 or 40A as is shown in the end views of FIG. 7 and 8, respectively. Such an exterior nut configuration can be convenient for engagement with a wrench. Those skilled in the art will recognize that many other forms of restraining means 20 may also be employed.

Cylindrical shaft 10 may comprise an interior thread 42 in order, for example, to secure a driven member 44 to shaft 10, as is further discussed above in connection with FIG. 5.

The present invention is to be limited only in accordance with the scope of the appended claims, since persons skilled in the art may devise other embodiments still within the limits of the claims.

What is claimed is:

1. An output shaft and bearing assembly, comprising:
    (a) a shaft having a central bore, the shaft further having a length terminating at first and second free ends, the shaft comprising a cylindrical outer surface proximate the first free end of the shaft;
    (b) a bearing assembly comprising a ball bearing having an inner race positioned over the cylindrical outer surface proximate the first free end of the shaft;
    (c) restraining means located along the length of the shaft and terminating proximate the second free end of the shaft for preventing the bearing assembly from coming off the second free end of the shaft;

(d) a thread formed in the bore at the second free end of the shaft; and (e) the first free end of the shaft comprising a cylindrical wall which defines a cylindrical chamber that opens to the first free end of the shaft and that is concentric with the central bore, the cylindrical wall having a wall thickness suitable for rounding over in an outward direction at the first free end of the shaft, the free end of the cylindrical wall being formed over the bearing assembly in order to secure the bearing assembly onto the shaft between the formed free end of the cylindrical wall and the restraining means, the shaft having a total length substantially defined by the formed cylindrical wall at the first free end of the shaft and by the restraining means terminating proximate the second free end of the shaft so that the shaft will fit within space confines of structure located in axial alignment with the formed cylindrical wall and the thread formed in the bore at the second free end of the shaft.

2. A random orbit sander, comprising:

(a) a power output shaft having a central axis of rotation oriented in a substantially vertical position when the sander is held for sanding a substantially horizontal surface, the power output shaft being configured for rotation and being coupled to a motor for rotation of the shaft;

(b) an eccentric housing coupled to the power output shaft for rotation therewith, the eccentric housing defining a substantially cylindrical chamber having a substantially vertical central axis which is offset from the central axis of rotation of the power output shaft, the cylindrical chamber having a lower open end adapted for receipt of hardware therein;

(c) a sanding pad shaft and bearing assembly, comprising:

(i) a sanding pad shaft having a central bore, the sanding pad shaft having a length terminating at first and second free ends, the sanding pad shaft comprising a cylindrical outer surface proximate the free end of the shaft;

(ii) a bearing assembly comprising a ball bearing having an inner race positioned over the cylindrical outer surface proximate the first free end of the sanding pad shaft;

(iii) restraining means located along the length of the sanding pad shaft and terminating proximate the second free end of the sanding pad shaft for preventing the bearing assembly from coming off the second free end of the sanding pad shaft;

(iv) a thread formed in the bore at the second free end of the sanding pad shaft; and (v) the first free end of the sanding pad shaft comprising a cylindrical wall which defines a cylindrical chamber that opens to the first free end of the sanding pad shaft and that is concentric with the central bore, the cylindrical wall having a wall thickness suitable for rounding over in an outward direction at the first free end of the sanding pad shaft, the free end of the cylindrical wall being formed over the bearing assembly in order to secure the bearing assembly onto the sanding pad shaft between the formed free end of the cylindrical wall and the restraining means, the sanding pad shaft having a total length substantially defined by the formed cylindrical wall at the first free end of the sanding pad shaft and by the restraining means terminating proximate the second free end of the sanding pad shaft; and (d) the bearing assembly comprising an outer portion which is secured rotationally into the substantially cylindrical chamber of the eccentric housing so that the outer portion of the bearing assembly rotates with the eccentric housing;

(e) rigid stop means securely coupled to the lower end of the eccentric housing and extending over the outer portion of the lower end of the bearing assembly in order to prevent the sanding pad shaft and bearing assembly from escaping downward from the cylindrical chamber of the eccentric housing during use of the random orbit sander; and (f) a sanding pad threaded into the thread formed in the bore at the second free end of the sanding pad shaft.

* * * * *